(12) United States Patent
Bernard et al.

(10) Patent No.: US 6,422,499 B1
(45) Date of Patent: Jul. 23, 2002

(54) FISHING REEL SPOOL HAVING A VARIABLE DIMENSIONED FRONT FLANGE

(76) Inventors: Jean Bernard, 134 Avenue des Lacs, 74950 Scionzier; Frederic Platel, 76 Avenue du Pont Neuf, 74970 Marignier, both of (FR)

( * ) Notice: Subject to any disclaimer, the term of this patent is extended or adjusted under 35 U.S.C. 154(b) by 0 days.

(21) Appl. No.: 09/162,846

(22) Filed: Sep. 29, 1998

(30) Foreign Application Priority Data

Sep. 29, 1997 (FR) .......................... 97 12525

(51) Int. Cl.⁷ .............................. A01K 89/00
(52) U.S. Cl. ..................... 242/322; 242/614
(58) Field of Search ................ 242/322, 319, 242/318, 614, 600, 606; D22/141

(56) References Cited

U.S. PATENT DOCUMENTS

| | | | | |
|---|---|---|---|---|
| 2,890,842 A | * | 6/1959 | Rickard | 242/322 X |
| D194,223 S | * | 12/1962 | Pandolfo | 242/614 X |
| 4,493,462 A | * | 1/1985 | Ditton | 242/614 X |
| 4,715,554 A | * | 12/1987 | Kuntze | 242/614 X |
| 5,697,567 A | * | 12/1997 | Sonenvald | 242/322 |
| 5,746,382 A | * | 5/1998 | Tsutsumi | 242/322 |
| 5,785,266 A | * | 7/1998 | Bowersox | 242/322 X |
| 5,911,378 A | * | 6/1999 | Plestan | 242/322 |

FOREIGN PATENT DOCUMENTS

DE  42 11 145 A1  10/1993

* cited by examiner

*Primary Examiner*—Donald P. Walsh
*Assistant Examiner*—Emmanuel M. Marcelo
(74) *Attorney, Agent, or Firm*—Roylance, Abrams, Berdo & Goodman, L.L.P.

(57) ABSTRACT

A fishing reel has a fixed spool and a rotary line pick up. The spool comprises a peripheral groove for line retrieval limited by a front flange and a rear flange. The front flange comprises, for example, three peripheral areas with a progressively smaller radius with a dimension of the radius that is smaller than the radius in the adjacent peripheral areas that separate them. Therefore we reduce the friction of the fishing line on the front flange of the spool during a casting operation.

26 Claims, 6 Drawing Sheets

PRIOR ART

Fig.11

FISHING REEL SPOOL HAVING A VARIABLE DIMENSIONED FRONT FLANGE

FIELD OF THE INVENTION

The present invention relates to fishing reels. In particular, the present invention relates to a spool configured to reduce friction during casting.

BACKGROUND OF THE INVENTION

This invention pertains to fishing reels with a fixed spool and a rotary line pick up, in which a rotary pick up drum supports a bail arm and is engaged in axial rotation by means of a crank handle. The retractable bail arm is articulated on the pick up drum to swivel between a retracted position that frees the fishing line in order to allow it to unwind axially from the spool, and a retrieval position that envelopes the spool for retrieving, for guiding and for winding the line onto the spool when the pick up drum rotates.

During use, the fishing reel is installed on the fishing rod with its front-rear shaft positioned parallel with the fishing rod, the spool being mounted on the front-rear axis of the reel. The spool comprises a peripheral groove for line retrieval that is limited by a front flange and a rear flange.

When rod and reel fishing, the line is initially wound on the spool. The fisherman swivels the bail arm to bring it into a retracted position, and he casts the line, which rapidly unwinds from the spool. During this casting operation, the line comes in contact and rubs on the periphery of the front flange of the spool.

With standard reels, we have already tried to reduce friction between the line and the periphery of the front flange of the spool to increase the range for casting. For this, we have provided a front flange, the type of surface of which helps the line slide better. In some reels, the periphery of the front flange has been made of ceramics.

These solutions generally lead to a considerable increase in the cost of manufacturing the reel, and the results do not last because of possible damage to the surface that is peripheral to the front flange of the spool, this damage is caused by wear of the surface and possible shocks that could arise while using the reel.

SUMMARY OF THE INVENTION

With this invention, a new means for reducing friction between the line and the periphery of the front flange of the spool in a fishing reel is suggested, in order to decrease the effort required by the user to reach a given distance while casting, or to increase the range for casting for a given throwing force.

The solution according to the invention consists of decreasing the points of contact between the line and the peripheral surface of the front flange of the reel, in order to reduce friction.

Therefore, to meet these objectives and others, according to the invention a spool for a fishing reel is designed to be mounted on the front-rear shaft of a fishing reel and comprises a peripheral groove for receiving the line that is limited by a front flange and by a rear flange; the front flange comprises at least two peripheral areas with a radius that is progressively smaller than the radius from the intermediate peripheral areas that is between them.

In a preferred method of implementation, the front flange comprises three peripheral areas with a smaller radius, evenly positioned relative to the perimeter of the front flange.

The intermediate areas on the front flange that separate the areas with a smaller radius preferably have a rounded peripheral profile to assist the normal peripheral sliding of the line while casting.

According to the invention, the size reductions of the radius in the peripheral areas with a smaller radius may be roughly the same, or different.

The amount by which the radius can be reduced in size in the areas with a smaller radius is preferably chosen to correspond approximately to the radial height of the spool taken by the quantity of line used for a nominal casting, that is for casting with a reel within the normal conditions. Usually, the size reduction of the radius may range between approximately 10% and 35% of the radius in the intermediate peripheral areas.

DETAILED DESCRIPTION OF THE PREFERRED EMBODIMENTS

Figure 1:
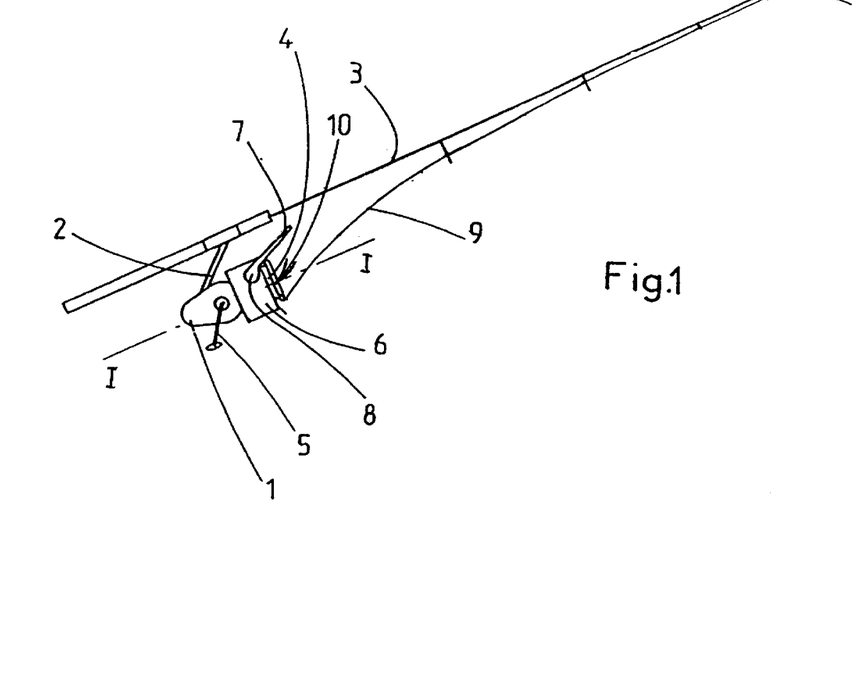
FIG. 1 is a side view that illustrates a fishing rod with a reel shown during the casting operation.

As illustrated in FIG. 1, fishing reels that are usually used for casting comprise a reel housing (1) with means (2) for fastening on a fishing rod (3). The reel housing (1) supports a spool (4) of which the symmetrical longitudinal axis I—I is approximately parallel with the direction of the fishing rod (3). The means for line retrieval comprise a crank handle (5) operated by the user, for driving the line pick up drum (6) mounted in axial rotation according to the axis I—I of the spool (4) through an internal gear mechanism mounted in the reel housing (1). The drum (6) supports a retractable bail arm (7) for line pick up, the bail arm (7) is articulated on the drum (6) according to a transverse rotation axis (8) to swivel between a retracted position represented in FIG. 1 that frees the fishing line (9) and has it unwind from the spool (4), and a retrieval position in which the bail arm (7) envelopes the spool (4) for retrieving, for guiding and for winding the line (9) onto the spool (4) while the drum (6) is rotating.

In FIG. 1, during the casting operation, the line (9) is pulled out from the spool (4) by the inertia of the weight attached to the loose end of the line (9), and the line (9) unwinds from the spool by rotating around the front flange (10) of the spool (4). During this movement, the line (9)

inevitably rubs against the peripheral area of the front flange (10) of the spool.

To reduce this friction and increase the casting performance, the invention suggests a front flange (10) of the spool with at least two peripheral areas with a radius that is progressively smaller.

Figure 2:
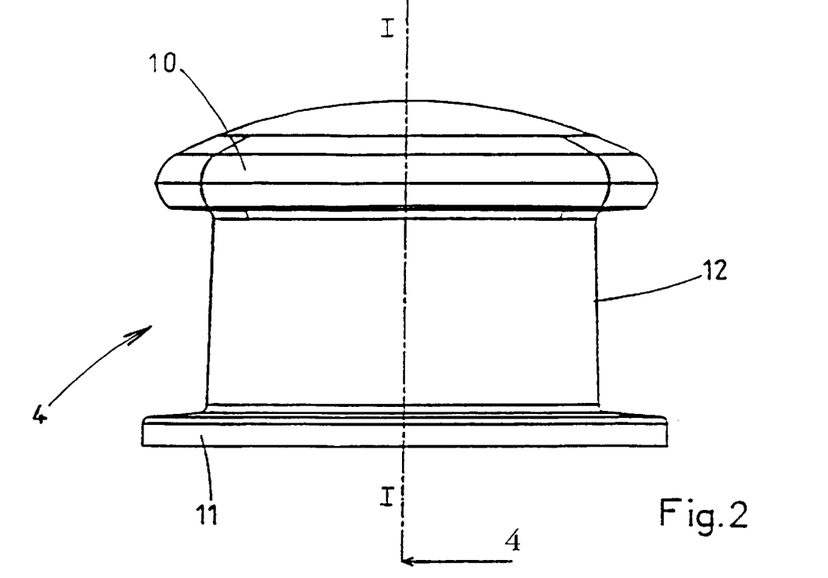
FIG. 2 is a side view of a spool from a fishing reel according to the first method of implementation for this invention.
Figure 3:
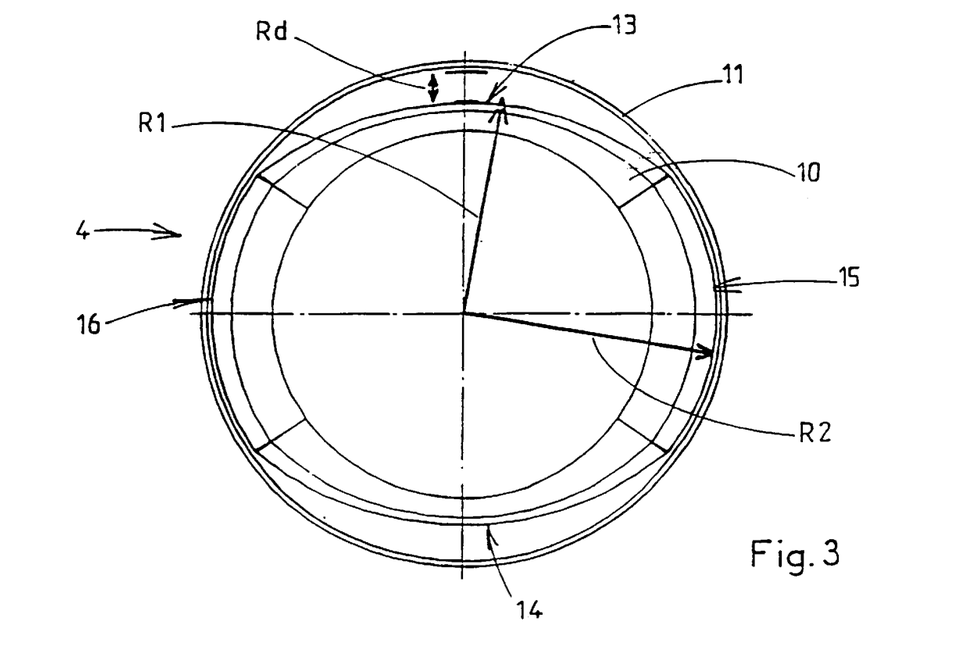
FIG. 3 is a front view of the spool represented in FIG. 2.
Figure 4:
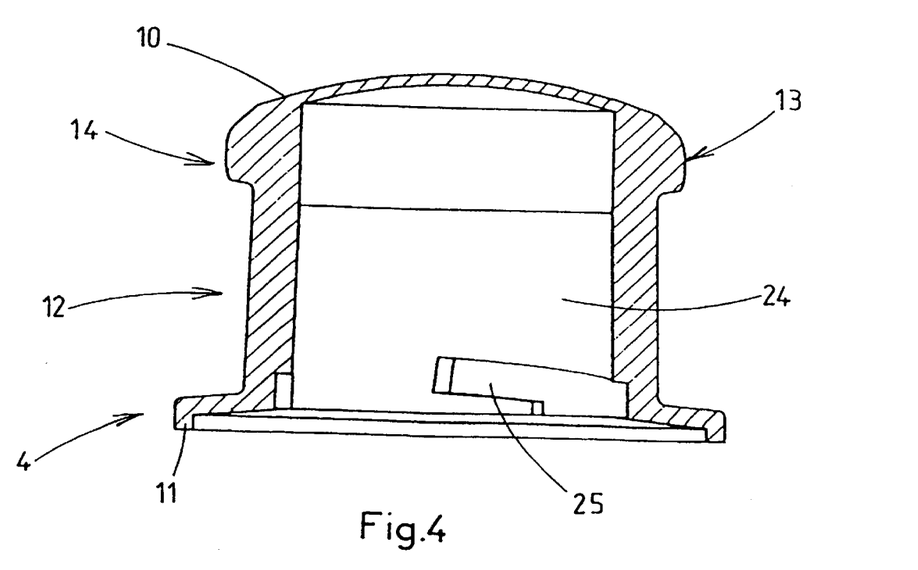
FIG. 4 is a cross section view according to the plane 4—4 of the spool represented in FIG. 2.

FIGS. 2 through 4 illustrate a first method of implementation for a spool like the one suggested in this invention, with at least two peripheral areas with a radius that is progressively smaller.

On the spool (4) in these FIGURES, we differentiate a front flange (10), a rear flange, and a peripheral groove (12) for receiving the line that is limited by the front flange (10) and by a rear flange (11).

The front flange (10) has a first peripheral area with a smaller radius (13), a second peripheral area with a smaller radius (14) that is diametrically opposed to the first peripheral area with a smaller radius (13), a first intermediate peripheral area (15) and a second intermediate peripheral area which are diametrically opposed one to the other and separate the peripheral areas with a smaller radius (13 & 14).

The intermediate peripheral areas (15 & 16) of the front flange (10) are connected to the adjacent peripheral areas with a smaller radius (13 & 14) according to a peripheral profile with a radius that varies regularly in dimension, as is illustrated in FIG. 3, providing the steady peripheral sliding of the line during the casting operation.

The radius R1 from the peripheral area with a smaller radius (13) or (14) is smaller than the radius R2 from the intermediate peripheral area (15) and (16). The size reduction Rd of the radius for the peripheral area with a smaller radius, which is the difference between the radius R2 from the intermediate areas (15) and (16) and the radius R1 from the areas with a smaller radius (13 & 14), is selected to correspond approximately to the radial height for the quantity of line wound onto the spool which would be used for a normal casting. In practice, this size reduction Rd for the radius may vary between 10% and 35% of the radius R2 from the intermediate peripheral area (15) and (16). For example, for carp fishing, the typical capacity for the spools is 300 meters of $^{28}/_{100}$ millimeter line and the castings may reach 100 meters, that is approximately 33% of the total capacity. The size reduction Rd of the radius corresponds to the area taken by these 100 meters of line on the spool.

Figure 5:
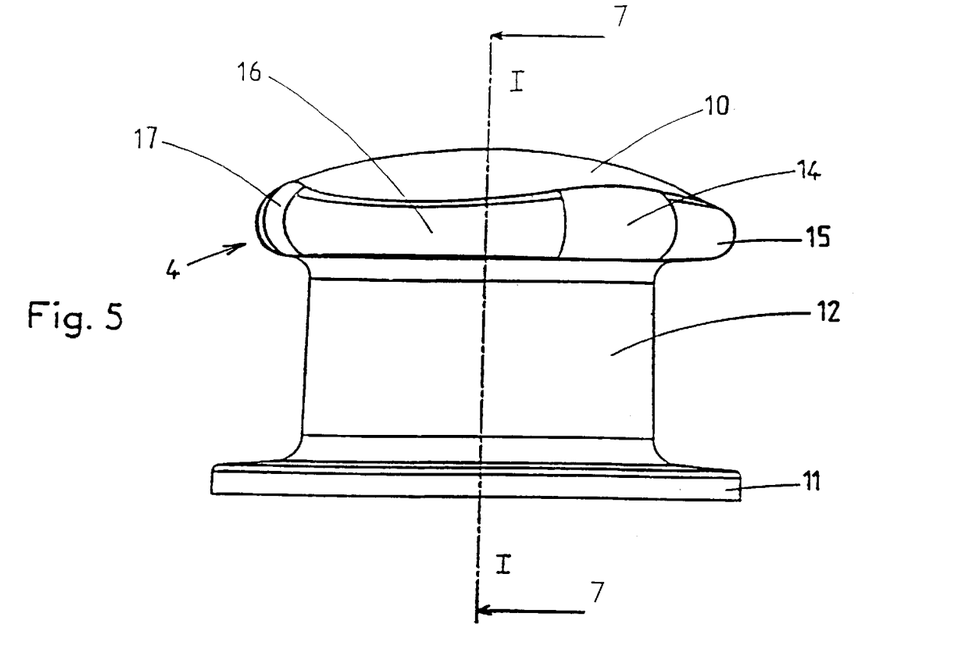
FIG. 5 is a side view of a spool from a fishing reel according to a second method of implementation for this invention.
Figure 6:
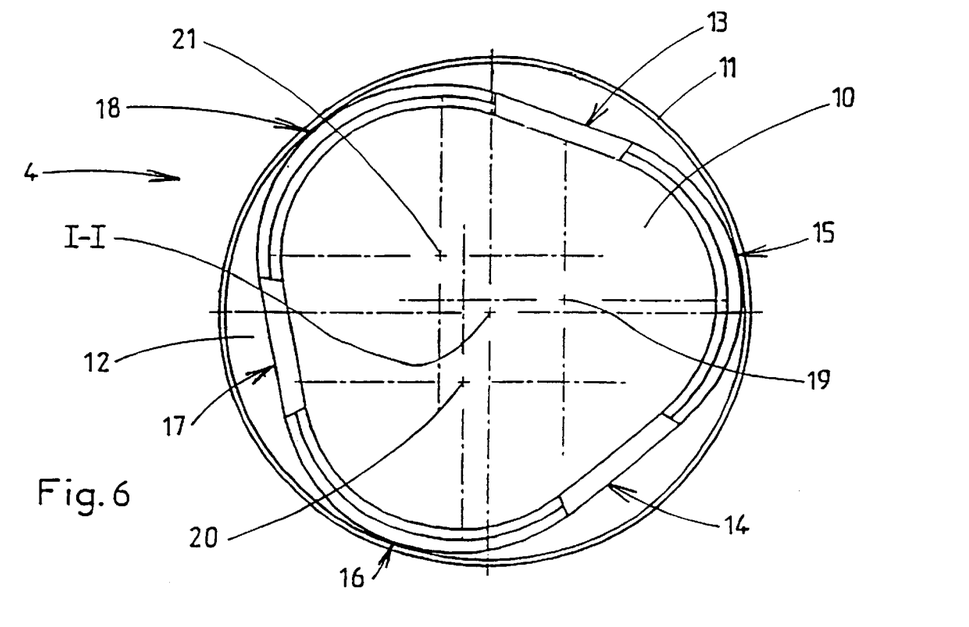
FIG. 6 is a front view of the spool represented in FIG. 5.
Figure 7:
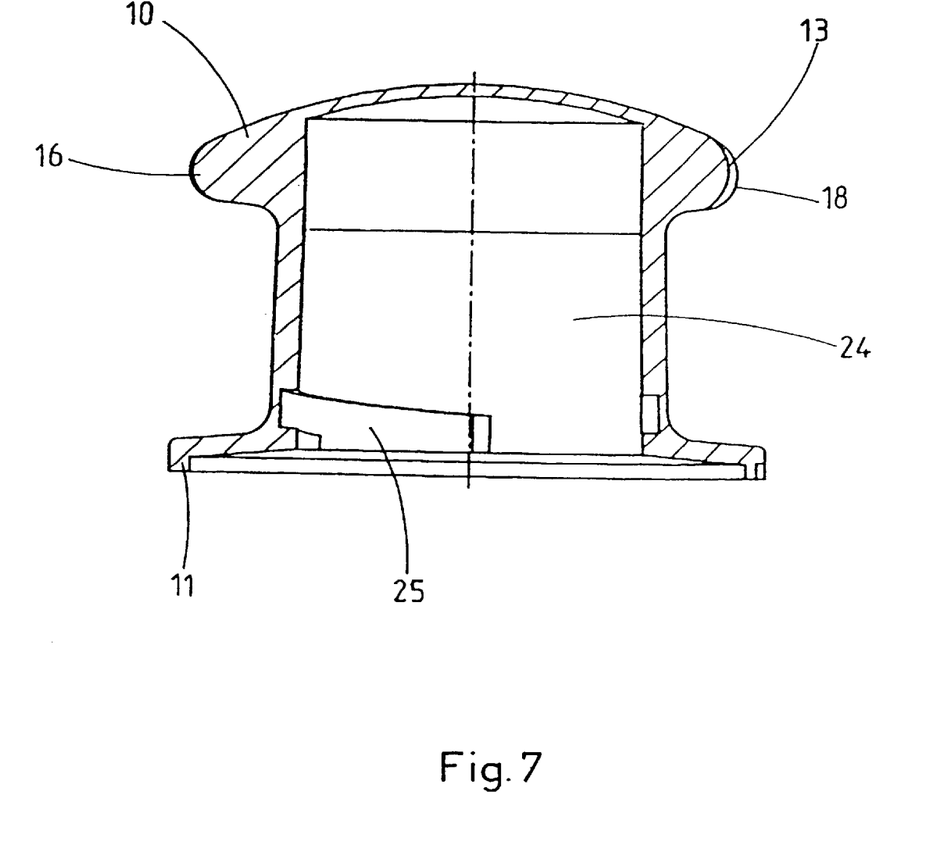
FIG. 7 is a longitudinal cross section view according to the plane 7—7 of the spool represented in FIG. 5.

In a second method of implementation illustrated in FIGS. 5 through 7, the spool features the same characteristics as in the method of implementation illustrated in FIGS. 1 through 4, with the difference that the front flange (10) comprises three peripheral areas with a smaller radius, evenly positioned according to the circumference of the front flange (10).

Therefore, we differentiate a first peripheral area with a smaller radius (13), a second peripheral area with a smaller radius (14) and a third peripheral area with a smaller radius (17), with a first intermediate peripheral area (15), a second intermediate peripheral area (16) and a third intermediate peripheral area (18). Each of these peripheral areas with a smaller radius (13, 14 & 17) may feature a rectilinear profile, as illustrated in FIG. 6, tangentially linked together through intermediate peripheral areas (15, 16 & 18) with a circular profile respectively centered on centers (19, 20, and 21) that are equidistant from the spool axis I—I. In the illustrated implementation, the size reductions Rd of the radius for the areas with a smaller radius (13, 14 & 17) are equal.

Figure 8:
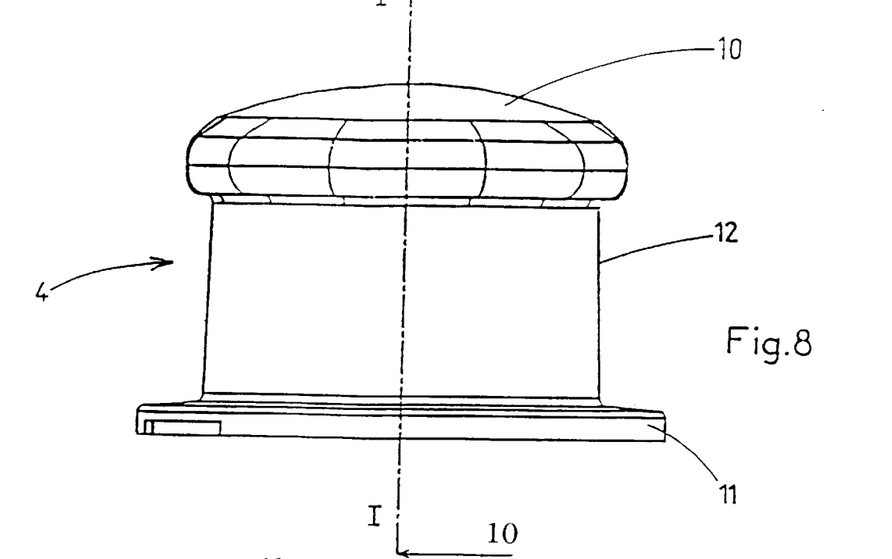
FIG. 8 is a side view of a spool from a fishing reel according to the third method of implementation for this invention.
Figure 9:
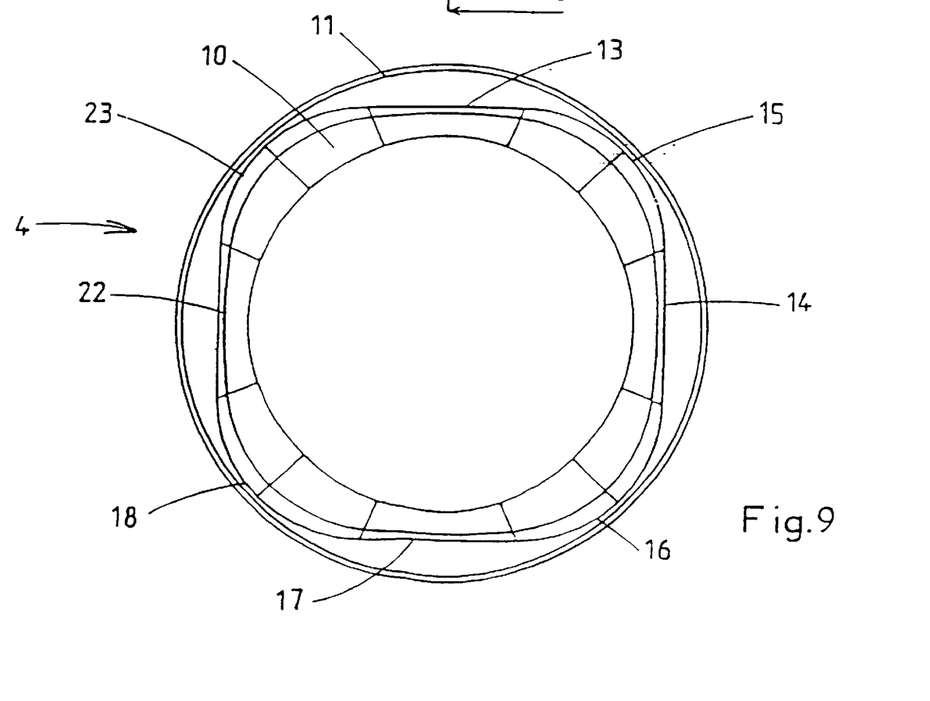
FIG. 9 is a front view of the spool represented in FIG. 8.
Figure 10:
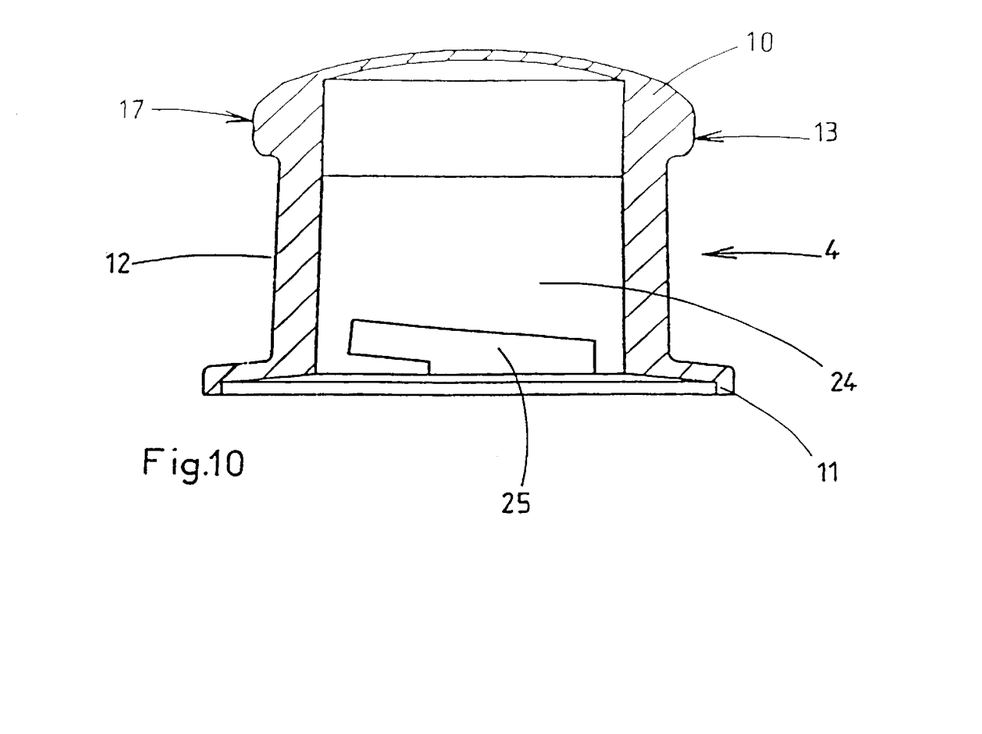
FIG. 10 is a cross section view according to the plane 10—10 of the spool represented in FIG. 8.

According to a third method of implementation, represented in FIGS. 8 through 10, the spool features the same basic elements as in the methods of implementation from FIGS. 2 through 7, and like elements are referenced with the same numerical references.

This third method of implementation differentiates itself from the others by the fact that the front flange (10) comprises four peripheral areas with a smaller radius. Therefore, we again find a first peripheral area with a smaller radius (13), a second peripheral area with a smaller radius (14), a third peripheral area with a smaller radius (17), and a fourth peripheral area with a smaller radius (22). The peripheral areas with a smaller radius are separated by intermediate peripheral areas with a first intermediate peripheral area (15), a second intermediate peripheral area (16), a third intermediate peripheral area (18), and a fourth intermediate peripheral area (23). The different peripheral areas with a smaller radius (13, 14, 17 and 22) are evenly positioned according to the circumference of the front flange (10), and feature a linear profile that is tangentially connected to the intermediate peripheral areas (15, 16, 18 and 23) which also feature a circular profile. We understand that other forms of peripheral areas with a smaller radius may be considered without departing from the framework for this invention, since the line can evenly slide on the periphery of the front flange (10) while it exits the spool axially, in parallel with the axis I—I, during a casting operation.

The spool in the fishing reel according to this invention may be interdependent with the front-rear shaft of the reel on which it is attached by any standard means.

As an option, the spool (4) can be mounted at the front end of the front-rear shaft of the fishing reel in a manner such that it is detachable, in order to be interchanged.

Figure 11:
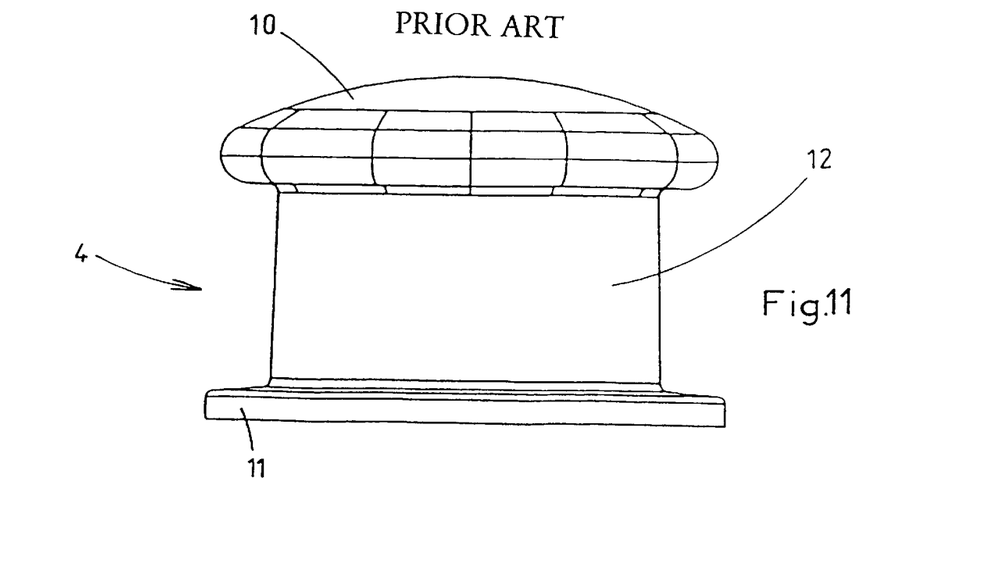
FIG. 11 is a side view of a spool from a fishing reel according to a previous design.

The methods of implementation illustrated in FIGS. 2 through 10 correspond to an interchangeable spool which can be fitted on a front hub that is interdependent with the front end of the front-rear shaft of the reel, onto which it is connected by means of a bayonet locking system. Therefore, we differentiate in FIGS. 4, 7 and 10 in longitudinal cross section a cylindrical inner cavity (24) open in the rear of the spool through the rear flange (11), and comprising a helical inside housing (25) intended to combine with the catch from the hub of the reel for holding the spool (4) in a manner so that it can be detached. Other fastening means which are available to the professional can be provided. For comparison, FIG. 11 illustrates an earlier design spool, in which the peripheral groove (12) for receiving the line is bordered with a rear flange (11) that is similar to the rear flange in FIGS. 2 through 10, and a front flange (10) of which the periphery features a circular profile with a radius that is approximately the same, against which the fishing line constantly rubs during the casting operation.

This invention is not limited to the methods of implementation that have been explicitly described, but it includes the various variants and generalizations contained in the following claims.

What is claimed is:

1. A spool for use with a fishing reel, the spool comprising:
   a peripheral groove extending along and about an axis, wherein the peripheral groove is adapted to receive fishing line;
   a rear flange on a rear side of the groove;
   a front flange on a front side of the groove, the front flange including:
   a first peripheral edge spaced from the axis by a first radial distance;
   a second peripheral edge extending from the first peripheral edge at an obtuse angle from the first peripheral edge on a first side of the first peripheral edge, the second peripheral edge spaced from the axis by a second radial distance less than the first radial distance; and a third peripheral edge extending from the first peripheral edge at an obtuse angle from the first peripheral edge on a second opposite side of the first peripheral edge, the third peripheral edge spaced from the axis by a third radial distance less than the first radial distance.

2. The spool of claim 1 wherein the second radial distance and the third radial distance are equal to one another.

3. The spool of claim 1 wherein the second radial distance is less than the first radial distance by a difference corresponding to a radial height of multiple winds of fishing line wound about the peripheral groove that are used during a cast.

4. The spool of claim 3 wherein the difference is between about 10% and 35% of the first radial distance.

5. The spool of claim 1 wherein the second radial distance is less than the first radial distance by a difference of between about 10% and 35% of the first radial distance.

6. The spool of claim 1 including a fourth peripheral edge adjacent to the second peripheral edge, the fourth peripheral edge spaced from the axis by a fourth radial distance greater than the second radial distance.

7. The spool of claim 6 including:
a fifth peripheral edge adjacent to the fourth peripheral edge, the fifth peripheral spaced from the axis by a fifth radial distance less than the fourth radial distance; and
a sixth peripheral edge adjacent to the fifth peripheral edge, the sixth peripheral edge spaced from the axis by a sixth radial distance greater than the fifth radial distance.

8. The spool of claim 7 including:
a seventh peripheral edge adjacent to the sixth peripheral edge, the seventh peripheral edge spaced from the axis by a seventh radial distance less than the sixth radial distance; and
an eighth peripheral edge adjacent to the seventh peripheral edge, the eighth peripheral edge spaced from the axis by an eighth radial distance greater than the seventh radial distance.

9. The spool of claim 1 wherein the front flange is generally rectangular in shape.

10. The spool of claim 1 wherein the front flange is generally triangular in shape.

11. The spool of claim 1 wherein the front flange is generally oval in shape.

12. The spool of claim 1 wherein the front flange is generally non-round in shape.

13. A spool for use with a fishing reel, the spool comprising:
a peripheral groove extending along and about an axis, wherein the peripheral groove is adapted to receive fishing line;
a rear flange on a rear side of the groove; and
a front flange on a front side of the groove, the front flange including:
a plurality of convex lobes located about the axis, each lobe including:
a first peripheral portion spaced from the axis by a first radial distance;
a second peripheral portion extending from the first peripheral portion at an obtuse angle from the first peripheral portion on a first side of the first peripheral portion, the second peripheral portion spaced from the axis by a second radial distance less than the first radial distance; and
a third peripheral portion extending from the first peripheral edge at an obtuse angle from the first peripheral portion on a second opposite side of the first peripheral portion, the third peripheral portion spaced from the axis by a third radial distance less than the first radial distance.

14. A fishing reel comprising:
a housing;
a pick up drum rotatably coupled to the housing about an axis;
a retractable bale arm carried by the pick up drum;
a crank handle operably coupled to the pick up drum to rotate the pick up drum; and
a spool coupled to the housing along the axis such that rotation of the drum and the bale arm winds fishing line about the spool, the spool including:
a peripheral groove extending along and about an axis, wherein the peripheral groove is adapted to receive fishing line;
a rear flange on a rear side of the groove;
a front flange on a front side of the groove, the front flange including:
a first peripheral edge spaced from the axis by a first radial distance;
a second peripheral edge extending from the first peripheral edge at an obtuse angle from the first peripheral edge on a first side of the first peripheral edge, the second peripheral edge spaced from the axis by a second radial distance less than the first radial distance; and
a third peripheral edge extending at an obtuse angle from the first peripheral edge on a second opposite side of the first peripheral edge, the third peripheral edge spaced from the axis by a third radial distance less than the first radial distance.

15. The fishing reel of claim 14 wherein the second radial distance and the third radial distance are equal to one another.

16. The fishing reel of claim 14 wherein the second radial distance is less than the first radial distance by a difference corresponding to the radial height of fishing line wound about the peripheral groove that is used during a cast.

17. The fishing reel of claim 16 wherein the difference is between about 10% and 35% of the first radial distance.

18. The fishing reel of claim 14 wherein the second radial distance is less than the first radial distance by a difference of between about 10% and 35% of the first radial distance.

19. The fishing reel of claim 14 including a fourth peripheral edge adjacent to the second peripheral edge, the fourth peripheral edge spaced from the axis by a fourth radial distance greater than the second radial distance.

20. The fishing reel of claim 19 including a fifth peripheral edge adjacent to the fourth peripheral edge, the fifth peripheral spaced from the axis by a fifth radial distance less than the fourth radial distance; and a sixth peripheral edge adjacent to the fifth peripheral edge, the sixth peripheral edge spaced from the axis by a sixth radial distance greater than the fifth radial distance.

21. The fishing reel of claim 20 including a seventh peripheral edge adjacent to the sixth peripheral edge, the seventh peripheral edge spaced from the axis by a seventh radial distance less than the sixth radial distance; and an eighth peripheral edge adjacent to the seventh peripheral edge, the eighth peripheral edge spaced from the axis by an eighth radial distance greater than the seventh radial distance.

22. The fishing reel of claim 14 wherein the front flange is generally rectangular in shape.

23. The fishing reel of claim 14 wherein the front flange is generally triangular in shape.

24. The fishing reel of claim 14 wherein the front flange is generally oval in shape.

25. The fishing reel of claim 14 wherein the front flange is generally non-round in shape.

26. A fishing reel comprising:

a housing;

a pick up drum rotatably coupled to the housing about an axis;

a retractable bale arm carried by the pick up drum;

a crank handle operably coupled to the pick up drum to rotate the pick up drum; and a spool coupled to the housing along the axis such that rotation of the drum and the bale arm winds fishing line about the spool, the spool including:

a peripheral groove extending along and about an axis, wherein the peripheral groove is adapted to receive fishing line;

a rear flange on a rear side of the groove;

a non-round front flange on a front side of the groove, the non-round front flange including:

a first edge portion spaced from the axis by a first radial distance;

a second edge portion angularly spaced from the first edge portion about the axis by at least 90 degrees about the axis and spaced from the axis by the first radial distance; and a third edge portion extending from the first edge portion to the second edge portion, wherein the entire third edge portion is spaced from the axis by at least one second radial distance less than the first radial distance.

* * * * *